Aug. 12, 1969  H. BAYER  3,461,385
SYSTEM FOR GIVING CALIBRATED AMPLITUDE INDICATIONS
Filed May 31, 1966  2 Sheets-Sheet 1
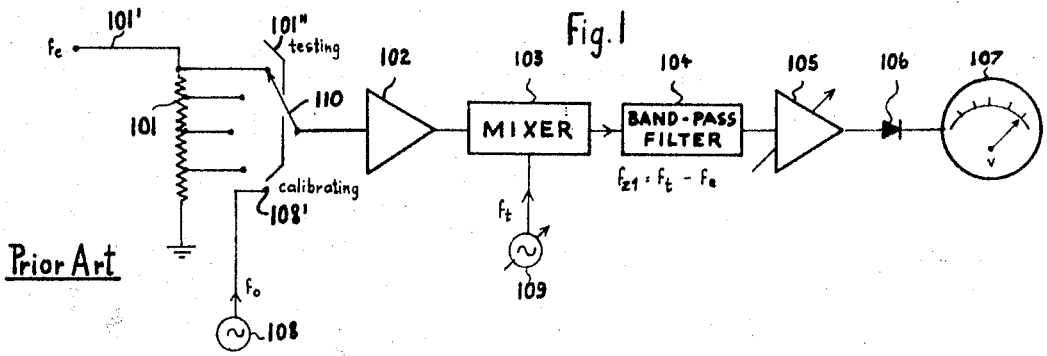
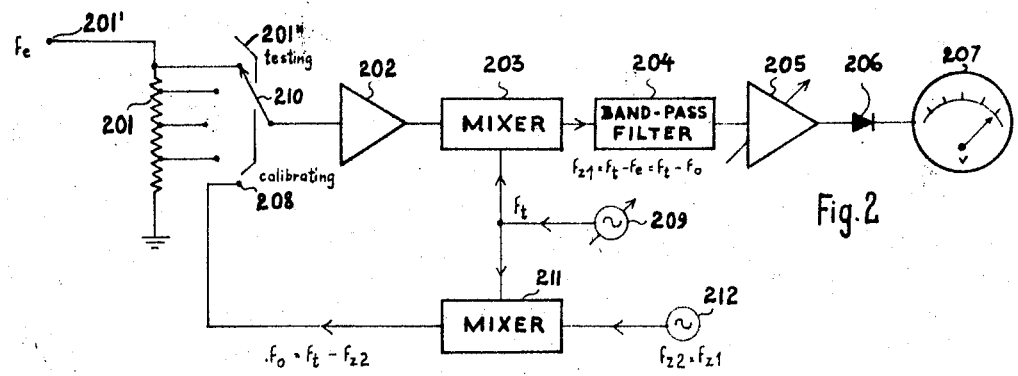
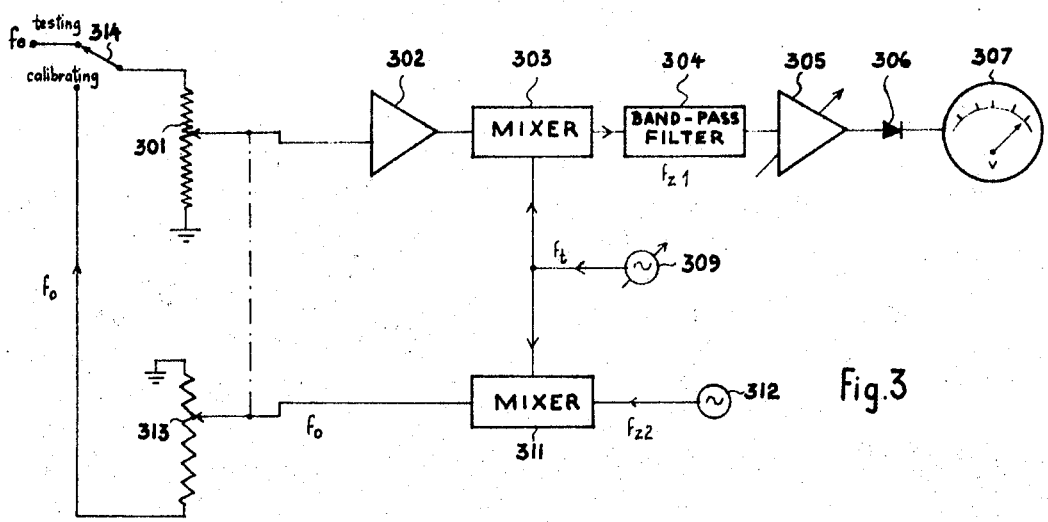
INVENTOR:
Herbert Bayer
BY
Karl G. Ross
Attorney

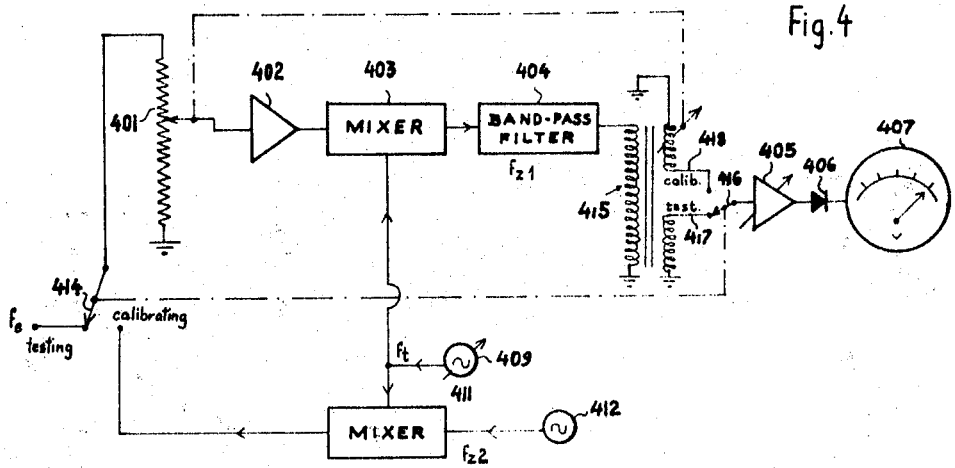
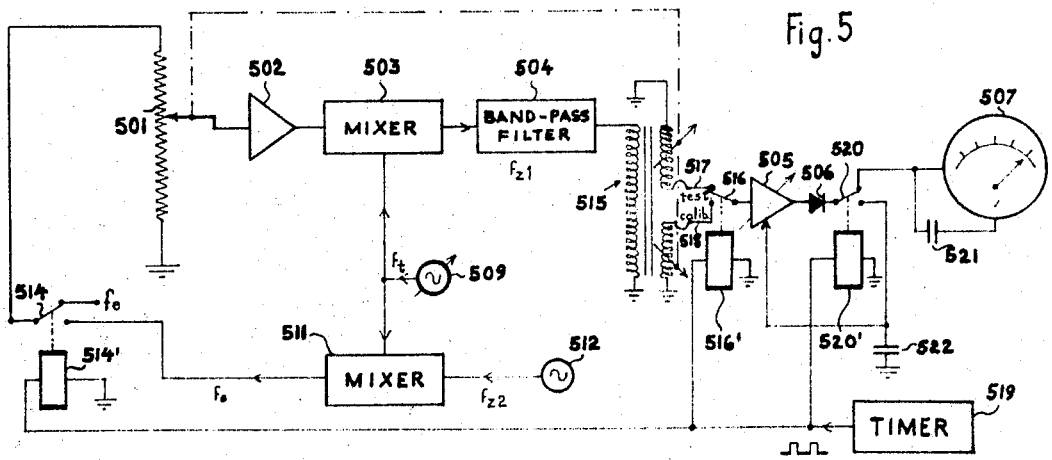
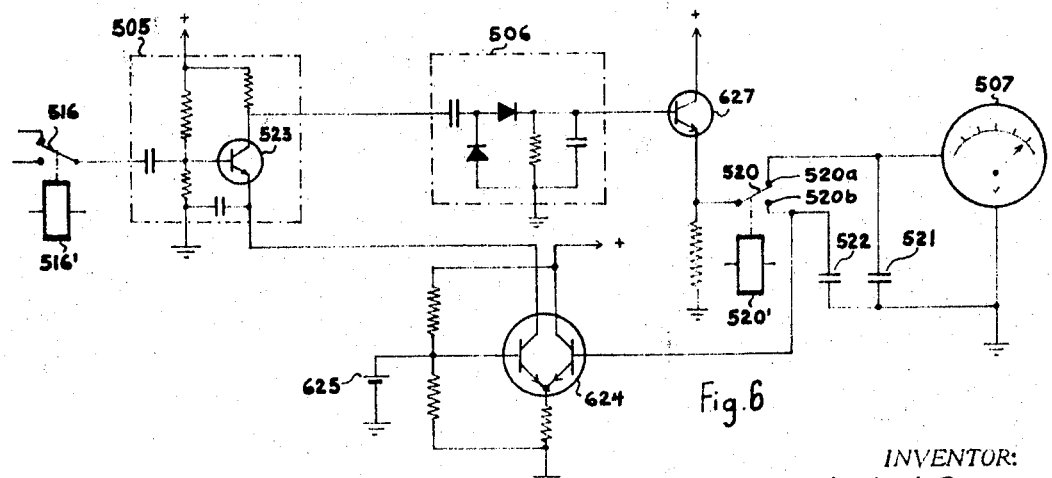

United States Patent Office 3,461,385
Patented Aug. 12, 1969

3,461,385
SYSTEM FOR GIVING CALIBRATED AMPLITUDE INDICATIONS
Herbert Bayer, Reutlingen, Germany, assignor to Wandel u. Goltermann KG., Eningen unter Achalm, Germany, a corporation of Germany
Filed May 31, 1966, Ser. No. 553,731
Claims priority, application Germany, May 28, 1965, W 39,236
Int. Cl. G01r 1/02
U.S. Cl. 324—130
4 Claims

ABSTRACT OF THE DISCLOSURE

Circuit arrangement for measuring amplitudes of different input frequencies $f_e$ which are heterodyned with a locally generated frequency $f_t = f_{z1} + f_e$ to produce a fixed beat frequency $f_{z1}$ passed by a narrow filter, the system including means for calibrating the transmission circuits with the aid of a locally generated reference wave of predetermined amplitude; means may be provided for periodically alternating between testing and calibration.

---

My present invention relates to a system for indicating the amplitudes of different alternating signal voltages and, more particularly, to a circuit arrangement for calibrating such system by substituting, at regular or irregular intervals, a reference wave of predetermined amplitude for the applied signal voltages.

In a system of this type it is customary to mix the applied signal voltage with a control frequency so selected that a resulting beat oscillation of invariable frequency $f_{z1}$ is transmitted to an indicating instrument, such as a voltmeter preceded by a rectifier, whereby the influence of frequency changes upon the indicator proper is eliminated. Thus, for example, the control frequency $f_t$ may be so chosen that $f_{z1} = f_t - f_e$ where $f_e$ is the frequency of the applied signal. If, now, the signal frequency $f_e$ is replaced by a reference wave of frequency $f_0$, the variable oscillator producing the control frequency $f_t$ must be readjusted to a frequency $f_{t0}$ which satisfies the relationship $f_{t0} - f_0 = f_{z1}$. Thereupon, the amplitude of the beat oscillation is measured in what will hereinafter be referred to as a "calibrating position" (although this term is not meant to connote conformation to some fixed standard) and the level of the indicator is adjusted, if necessary, to compensate for any changes in the transmission characteristics of the system that may have occurred since the last previous calibration. Finally, the system is switched back to its "test position" in which the control-frequency oscillator must be readjusted to produce the desired frequency $f_t$ corresponding to the applied signal.

The general object of this invention is to provide an improved circuit arrangement of the character described in which the need for adjustment and readjustment of the control-frequency oscillator before and after calibration is eliminated.

A more particular object of my invention is to provide a system of this description having means for automatically switching between the two aforementioned positions ("test" and "calibrating") and, also automatically, adjusting the level control of the indicator in accordance with the amplitude of the beat oscillation measured during calibration.

Pursuant to an important feature of the invention, the reference wave of frequency $f_0$ is synthesized from two constituent frequencies, i.e., the output $f_t$ of the variable control-frequency oscillator and a fixed base frequency $f_{z2}$ equal to the beat frequency $f_{z1}$. These two frequencies $f_t$ and $f_{z2}$ are combined in a further mixer, e.g., according to the formula $f_0 = f_t - f_{z2}$, in such a way that the beat frequency $f_{z1} = f_{z2}$ is reconstituted in the primary mixer which heterodynes the reference wave with the control frequency $f_t$. Thus, the reference frequency $f_0$ varies in step with the control frequency $f_t$ so that the beat frequency $f_z = f_{z1} = _{z2}$ remains fixed and is independent of the setting of the variable oscillator which therefore no longer need be altered for purposes of calibration.

Frequently, a system of the general type referred to includes in its input a voltage divider or other adjustable stepdown device whose output can be varied by definite increments for the purpose of reducing the applied signal voltage, if necessary, to a magnitude within a predetermined amplitude range. In order that this stepdown device may be included in the calibration circuit, another desirable feature of my invention resides in the provision of adjustable impedance means ganged with this device in a relatively inverted sense so that, upon connection thereof in the transmission path when the system is in its calibrating position, the voltage level of the beat oscillation remains substantially constant in any position of the device. The adjustable impedance means, connectable in cascade with the second mixer, may be disposed between the latter and the test/calibration switch or directly in the output of a filter which selects the beat frequency produced by the first mixer. In the former case, especially, the impedance means may be purely resistive (preferably a low-ohmic voltage divider compared with a high-ohmic divider constituting the stepdown device in the input) so as to represent a broad-band termination for the variable-frequency output of the second mixer; in the other instance, a reactive impedance such as a stepdown transformer may conveniently be used since only the beat frequency $f_z$ will pass therethrough.

In accordance with a further feature of my invention, the test/calibration switch is automatically and periodically reversed under the control of a timer, advantageously with alternations of relatively long test intervals and relatively short calibrating intervals. To obviate the need for manual readjustment, the level control of the indicator may be designed as a capacitively biased amplifier whose input capacitor is charged during calibration by the rectified output of the beat-frequency filter; during the ensuing test interval, this bias remains substantially constant. If the indicator proper is disconnected from the filter by contacts of the timer-operated switch during calibration, continuity of indication may be insured by the provision of a storage condenser in the indicator input to maintain the previously applied signal potential throughout the calibration interval.

The above and other features of my present invention will become apparent in greater detail from the following description given in conjunction with the accompanying drawing in which:

FIG. 1 is a circuit diagram of a conventional system designed to provide calibrated indications of signal amplitudes;

FIG. 2 is a circuit diagram similar to FIG. 1, illustrating my present improvement;

FIG. 3 is another circuit diagram representing a modification of the improved system of FIG. 2;

FIG. 4 is a further circuit diagram illustrating still another embodiment;

FIG. 5 is a circuit diagram of an embodiment with automatic switchover; and

FIG. 6 is a fragmentary circuit diagram showing details of the system of FIG. 5.

Analogous elements in the several figures are designated by similar reference numerals which differ only in their hundreds digit.

The conventional system shown in FIG. 1 comprises a voltage divider 101 having an input terminal 101' connected to a source of signal voltages $f_e$ and a set of output terminals 101'' selectively engageable by a switch armature 110. In an alternate position, this armature engages a contact 108' connected to the output of a fixed-frequency oscillator 108 which generates a reference wave of frequency $f_0$.

Switch 110 works into an amplifier 102 whose output is delivered to a mixer 103 along with a frequency $f_t$ produced by a variable oscillator 109. Mixer 103 derives therefrom a beat frequency $f_{z1}=f_t-f_e$ which, after clearing a band-pass filter 104 centered thereon, is fed to an adjustable amplifier 105 whose output is rectified in a network 106 and applies an input potential to a voltage indicator 107.

In the operation of the system of FIG. 1, the following five steps must be performed from time to time for proper calibration:

(a) Moving switch 110 into "calibrating" position on contact 108';

(b) adjusting the oscillator 109 to an output frequency $f_{t0}=f_{z1}+f_0$;

(c) reading the instrument 107 and, if necessary, adjusting the amplifier 105 to establish a predetermined signal level in the output of rectifier 106;

(d) restoring switch 110 to the selected contact 101'';

(e) returning oscillator 109 to provide a control frequency $f_t$ which bears the relationship $f_t=f_e+f_{z1}$ to the applied signal voltage $f_e$.

In accordance with the improvement illustrated in FIG. 2, I replace the fixed-frequency oscillation generator 108 of FIG. 1 by an oscillator 212 which produces a fixed base frequency $f_{z2}=f_{z1}$, this oscillator working into a mixer 211 which also receives the output $f_t$ of generator 209 to derive therefrom the reference frequency $f_0=f_t-f_{z2}$. Mixer 203 then reconstitutes the beat frequency $f_{z1}$ which is passed by the filter 204 and is independent of the setting of control-frequency oscillator 209, being equal to the operating frequency $f_{z2}$ of source 212. Thus, steps (b) and (d) are omitted in the calibration of the system of FIG. 2. Moreover, since the reference frequency $f_0$ equals the signal frequency $f_e$ for which the oscillator 209 has been preset, the same frequency passes through circuits 202 and 203 during calibration and testing so that the frequency characteristics of these circuits no longer affect the result. The measurement, therefore, is much more accurate.

The system of FIG. 3 differs from that of FIG. 2 by the interposition of a potentiometer 313 between mixer 311 and a switch 314 replacing the armature 210 of the preceding embodiment, this switch serving only for the changeover between testing and calibrating. Voltage divider 201 has been replaced by a similar potentiometer 301 which is invertedly ganged with potentiometer 313 so that their combined attenuation of reference wave $f_0$, in the calibrating position, is constant for any setting of the two potentiometers. Element 301 may be a high-ohmic resistance while element 313 represents only a low-ohmic termination of mixer 311. It may be mentioned that such broad-band termination of this mixer greatly reduces losses and frequency-dependent attenuation changes in circuit 311.

FIG. 4 shows the replacement of variable impedance 313 by a stepdown transformer 415 connected in the output of band filter 404. Transformer 415 has a first output lead 417, of fixed stepdown ratio, and a second output lead 418 whose stepdown ratio is variable complementarily to the attenuation of potentiometer 401 ganged therewith. A switch arm 416, ganged with arm 414, connects the input of amplifier 405 to lead 417 in test position and to lead 418 in calibrating position.

The system of FIG. 5 is similar to that of FIG. 4, except that the ganged switch arms 514, 516 are shown controlled by a timer 519 which also concurrently operates a further armature 520 associated with the input circuit 505, 506 of indicator 507. As shown more clearly in FIG. 6, where the same reference numerals are used as in FIG. 5, armature 520 alternately engages a pair of contacts 520a (testing) and 520b (calibrating) respectively connected to two grounded capacitors 521, 522. Condenser 521 maintains a substantially constant input potential for indicator 507 during calibration when the output of rectifier 506, amplified by a D-C amplifier 627, is disconnected from this indicator. Amplifier 505 is shown to comprise a transistor 523 having its emitter biased by a differential amplifier 624, one input of the latter having applied thereto a fixed biasing voltage from a battery 625 whereas its other input is connected to condenser 522 so that its gain, and therefore that of transistor 523, depends on the charging potential of this condenser. Signal amplification during testing is therefore determined by the charging voltage developed during the preceding calibration period. The switchover from testing to calibration may occur at, say, one-second intervals, with calibration lasting for 50 msec. Contacts 514, 516 and 520 are the armatures of relays having timer-energized windings 514' 516' and 520'.

It will be apparent that the feedback circuit of beat-frequency amplifier 505, including the capacitor 522 and the differential amplifier 624, compensates for changes in circuit parameters in substantially the same manner as would an operator supervising the system of FIG. 2, 3 or 4, i.e. by varying the gain of the beat-frequency amplifier until its output voltage has been restored to, approximately, a predetermined magnitude; naturally, slight variations in capacitor potential will be necessary in order to make the gain control operative.

Although the output lead 417 of FIG. 4 has been shown fixedly connected to an invariable secondary winding of transformer 415, its voltage could also be made adjustable (as illustrated for the lead 517 in FIG. 5) inversely with reference to that of lead 418 (or 518), thus in the same sense as that of the input potentiometer 401 (or 501). This reduces the required range of adjustability of that potentiometer. Naturally, the elements 202–502 and 203–503 should have a linear transmission characteristic within the range of reference frequencies $f_0$ applied thereto.

If desired, the one-stage mixer 203–503 may be replaced by a plurality of mixing stages connected in cascade, e.g., for the purpose of lowering the single beat frequency passing through the transformer 415 or 515. Thus, one or more additional mixers each with its own fixed-frequency oscillator, similar to generators 212–512, may be inserted between mixer 403, 503 and filter 404, 504.

I claim:

1. A circuit arrangement for giving a calibrated indication of the amplitudes of alternating signal voltages of different frequencies, comprising:

input means connectable to a source of signal voltage to be measured;

variable oscillator means for producing a selected control frequency bearing a predetermined relationship with the frequency of a signal voltage applied to said input means, said input means including an adjustable stepdown device for reducing said applied signal voltage to a magnitude within a predetermined amplitude range;

first mixer means connected to the outputs of said input means and said oscillator means for deriving from said signal voltage and from said control frequency a fixed-frequency beat oscillation;

filter means selectively passing the frequency of said beat oscillation;

amplitude-indicating means connected by way of said filter means to the output of said first mixer means for receiving said beat oscillation therefrom, said amplitude-indicating means being provided with level-control means adjustable according to the amplitude of said beat oscillation upon the substitution of a reference wave of predetermined amplitude for said signal voltage;

generator means for producing said reference wave, said generator means including a source of a fixed base frequency equal to that of said beat oscillation and second mixer means connected to the outputs of the last-mentioned source and said variable oscillator means for deriving from said base frequency and said control frequency an oscillation constituting said reference wave and adapted to yield a beat oscillation of said base frequency upon recombination with said control frequency in said first mixer means;

switch means having a test position and a calibrating position for respectively applying said signal voltage and a calibrating voltage to said first mixer means; and adjustable impedance means in the output of said filter means invertedly ganged with said stepdown device and connectable by said switch means, in said calibrating position thereof, in cascade with said second mixer means for maintaining a substantially constant voltage level of the beat oscillation passed by said filter means irrespectively of the position of said stepdown device.

2. A circuit arrangement as defined in claim 1 wherein said impedance means comprises a stepdown transformer.

3. A circuit arrangement for giving a calibrated indication of the amplitudes of alternating voltages of different frequencies, comprising:

input means connectable to a source of signal voltage to be measured;

variable oscillator means for producing a selected control frequency bearing a predetermined relationship with the frequency of a signal voltage applied to said input means;

first mixer means connected to the outputs of said input means and said oscillator means for deriving from said signal voltage and from said control frequency a fixed-frequency beat oscillation;

filter means selectively passing the frequency of said beat oscillation;

amplitude-indicating means connected by way of said filter means to the output of said first mixer means for receiving said beat oscillation therefrom, said amplitude-indicating means being provided with level-control means adjustable according to the amplitude of said beat oscillation upon the substitution of a reference wave of pretermined amplitude for said signal voltage;

generator means for producing said reference wave, said generator means including a source of a fixed base frequency equal to that of said beat oscillation and second mixer means connected to the outputs of the last-mentioned source and said variable oscillator means for deriving from said base frequency and said control frequency an oscillation constituting said reference wave and adapted to yield a beat oscillation of said base frequency upon recombination with said control frequency in said first mixer means;

and switch means having a test position and a calibrating position for respectively applying said signal voltage and a calibrating voltage to said first mixer means;

said switch means including a set of timer-controlled contacts periodically shiftable between said test position and said calibrating position, said level-control means comprising an amplifier provided with a biasing circuit including a capacitor, said amplitude-indicating means having an input circuit provided with rectifier means connectable by said switch means in said calibrating position to charge said capacitor, thereby varying the gain of said amplifier in response to changes in the amplitude level of said beat oscillation during application of said reference wave to said input means.

4. A circuit arrangement as defined in claim 3 wherein said input circuit further includes condenser means for storing the rectified output of said filter means during application of said reference wave, said switch means disconnecting said filter means from said amplitude-indicating means in said calibrating position.

References Cited

UNITED STATES PATENTS

| 2,919,401 | 12/1959 | Cole et al. | 324—130 X |
| 3,181,063 | 4/1965 | Ullrich | 324—130 X |
| 3,332,019 | 7/1967 | Leostic et al. | 325—363 |

FOREIGN PATENTS

| 946,163 | 1/1964 | Great Britain. |

RUDOLPH V. ROLINEC, Primary Examiner

ALFRED E. SMITH, Assistant Examiner

U.S. Cl. X.R.

324—74; 325—363